(12) United States Patent

Bou Nader

(10) Patent No.: US 12,623,510 B2
(45) Date of Patent: May 12, 2026

(54) TRI-GENERATION TURBOMACHINE DEVICE AND VEHICLE COMPRISING SUCH A DEVICE

(71) Applicant: PSA AUTOMOBILES SA, Poissy (FR)

(72) Inventor: Wissam Bou Nader, Palaiseau (FR)

(73) Assignee: PSA AUTOMOBILES S.A., Poissy (FR)

( * ) Notice: Subject to any disclaimer, the term of this patent is extended or adjusted under 35 U.S.C. 154(b) by 163 days.

(21) Appl. No.: 18/548,826

(22) PCT Filed: Feb. 1, 2022

(86) PCT No.: PCT/FR2022/050170
§ 371 (c)(1),
(2) Date: Sep. 1, 2023

(87) PCT Pub. No.: WO2022/189712
PCT Pub. Date: Sep. 15, 2022

(65) Prior Publication Data

US 2024/0149644 A1       May 9, 2024

(30) Foreign Application Priority Data

Mar. 9, 2021    (FR) ...................................... 2102250

(51) Int. Cl.
B60H 1/32          (2006.01)
B60H 1/14          (2006.01)
(Continued)

(52) U.S. Cl.
CPC ............. B60H 1/3222 (2013.01); B60H 1/14 (2013.01); B60H 1/323 (2013.01); F01D 15/02 (2013.01);
(Continued)

(58) Field of Classification Search
CPC ... B64D 13/08; F02C 6/00; F02C 6/04; F02C 6/06; F02C 6/08; F25B 9/004; F25B 9/06;
(Continued)

(56) References Cited

U.S. PATENT DOCUMENTS 4,295,518 A * 10/1981 Rannenberg .......... F24F 5/0085
                                                                        62/401
5,014,518 A * 5/1991 Thomson ............... B64D 13/06
                                                                        62/88
(Continued)

FOREIGN PATENT DOCUMENTS

DE            4106046 A1     1/1992
DE     10 2016 213590 A1     1/2018
(Continued)

OTHER PUBLICATIONS

International Search Report to PCT/FR2022/050170 mailed May 20, 2022.
Written Opinion to PCT/FR2022/050170 mailed May 20, 2022.

*Primary Examiner* — Christopher R Zerphey
(74) *Attorney, Agent, or Firm* — Sandberg Phoenix & von Gontard, PC

(57) ABSTRACT

The invention relates to a turbomachine device of the intercooled recuperated reheated gas turbine (IRReGT) type. The invention relates to applications for motor vehicles. The turbomachine device comprises a first turbocompressor (C1, T2), a second turbocompressor (C2, T1), two combustion chambers (CC1, CC2) or an exhaust line (EL), an intercooler (IC) and a heat exchanger (E1). The device is configured to implement a stream of fluid (F1) from the first compressor (C1) to the intercooler (IC), to the second compressor (C2), to the heat exchanger (E1), to the turbines (T1, T2). According to one aspect, the device comprises at least one vehicle interior air conditioning section comprising at least a means (Continued)

for producing cold (E1F, E2F) and/or heat (E1C) on the basis of said stream (F1).

8 Claims, 3 Drawing Sheets

(51) Int. Cl.

| | |
|---|---|
| *F01D 15/02* | (2006.01) |
| *F01D 15/10* | (2006.01) |
| *F02C 6/00* | (2006.01) |
| *F02C 6/20* | (2006.01) |
| *F25B 9/00* | (2006.01) |
| *F25B 9/06* | (2006.01) |
| *F25B 27/00* | (2006.01) |

(52) U.S. Cl.
    CPC ................ *F01D 15/10* (2013.01); *F02C 6/00* (2013.01); *F02C 6/20* (2013.01); *F25B 9/004* (2013.01); *F25B 9/06* (2013.01); *F25B 27/00* (2013.01); *F05D 2260/213* (2013.01); *F25B 2327/00* (2013.01); *F25B 2400/072* (2013.01)

(58) Field of Classification Search
    CPC ... F25B 9/10; F25B 27/00; B60H 1/14; B60H 1/3222; B60H 1/323
    See application file for complete search history.

(56) References Cited

U.S. PATENT DOCUMENTS

| | | | |
|---|---|---|---|
| 5,899,085 A * | 5/1999 | Williams | ............... B64D 13/06 |
| | | | 62/236 |
| 11,077,949 B2 * | 8/2021 | Behrens | ................. F01D 15/10 |
| 12,215,908 B1 * | 2/2025 | Primbas | ............... F24F 5/0085 |
| 2002/0152754 A1 * | 10/2002 | MacKay | .................. F02C 7/10 |
| | | | 60/39.511 |
| 2013/0111923 A1 | 5/2013 | Donnelly et al. | |

FOREIGN PATENT DOCUMENTS

| | | |
|---|---|---|
| EP | 0208162 B1 | 2/1992 |
| FR | 3032227 A1 | 8/2016 |
| WO | 2008087685 A2 | 7/2008 |

* cited by examiner

[Fig. 1]
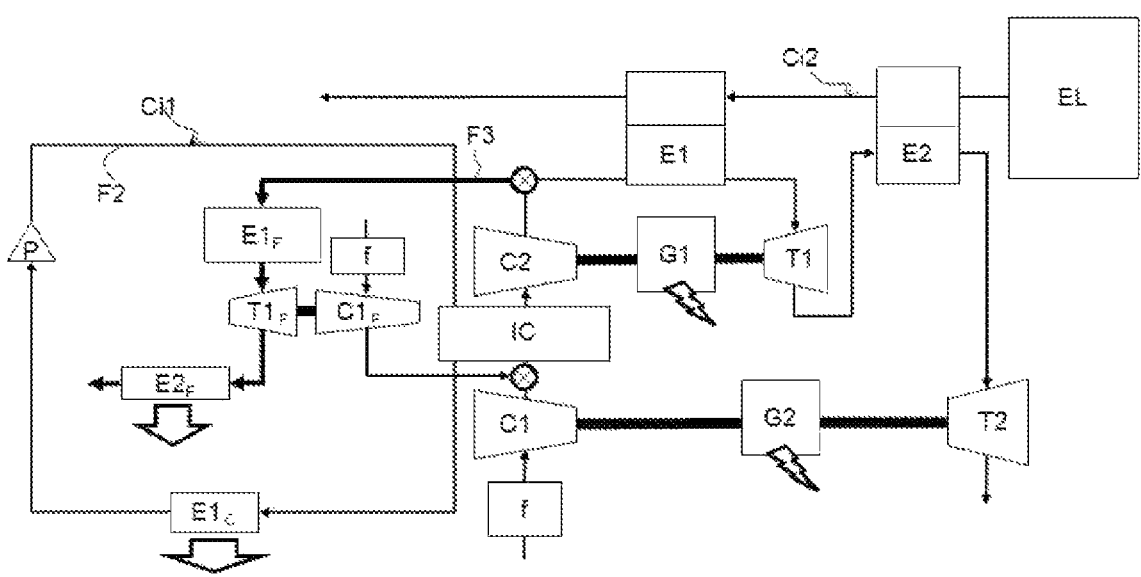
[Fig. 2]
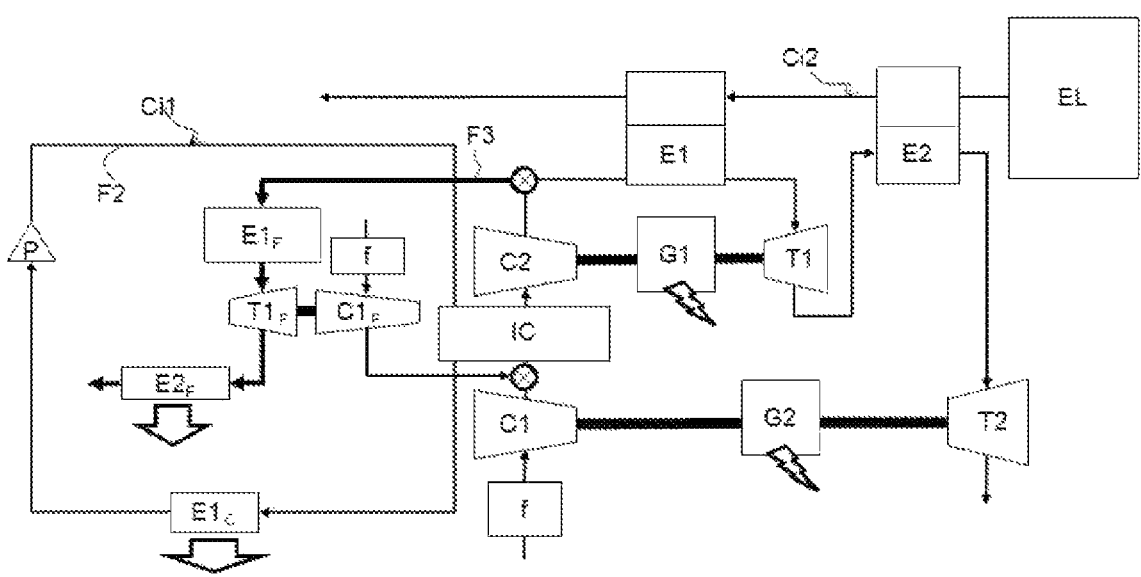

[Fig. 3]
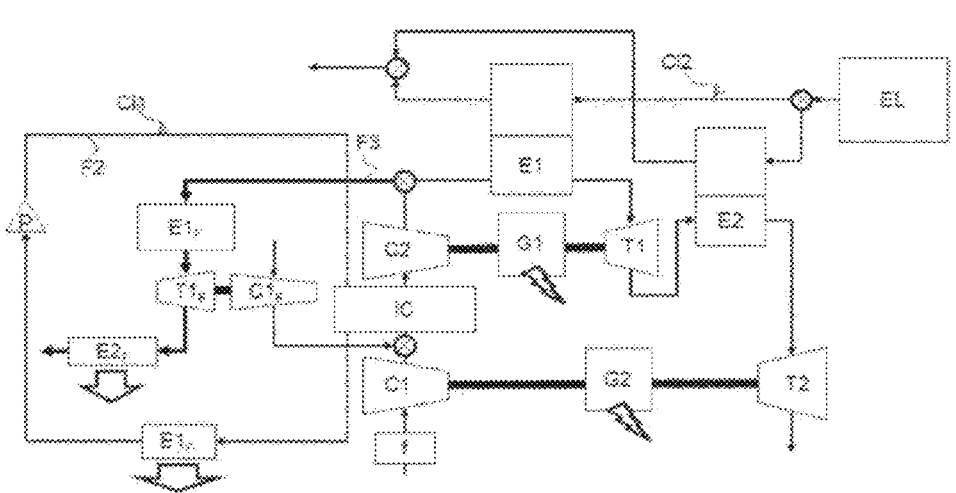
[Fig. 4]
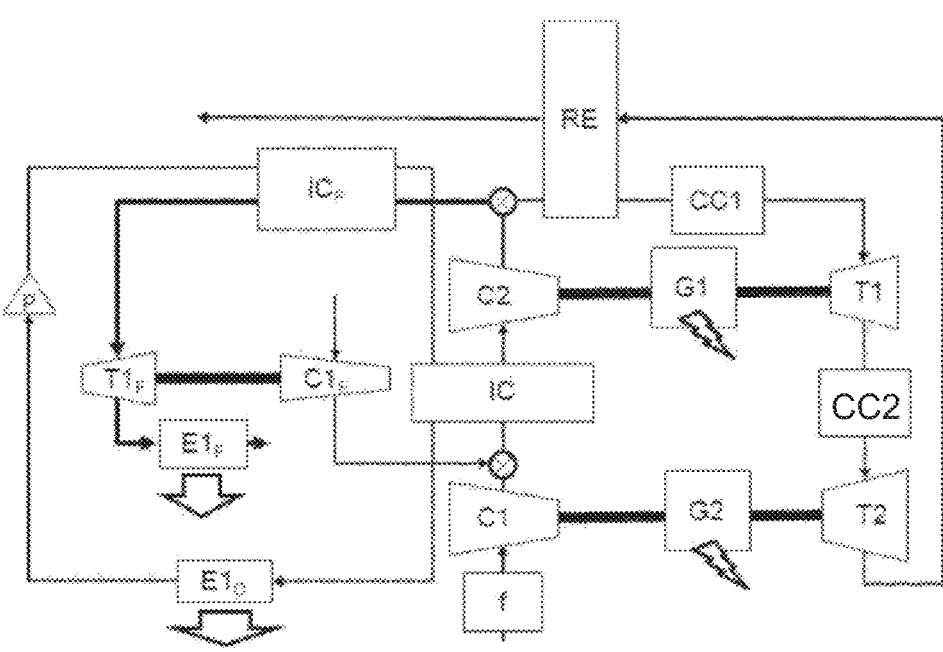

[Fig. 5]
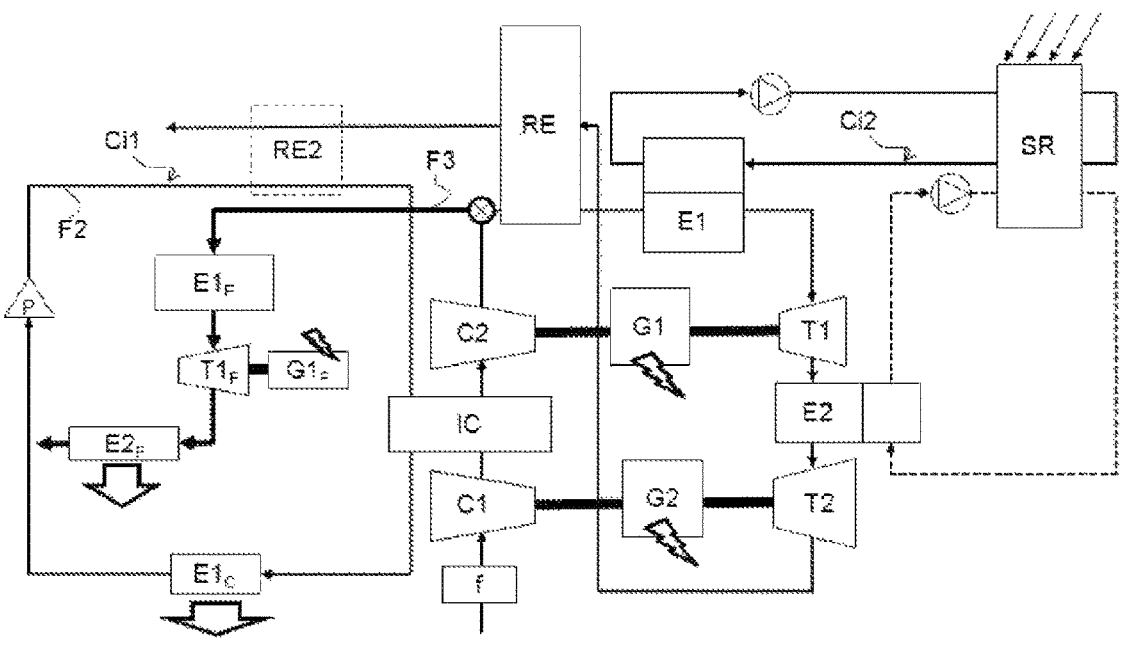
[Fig. 6]
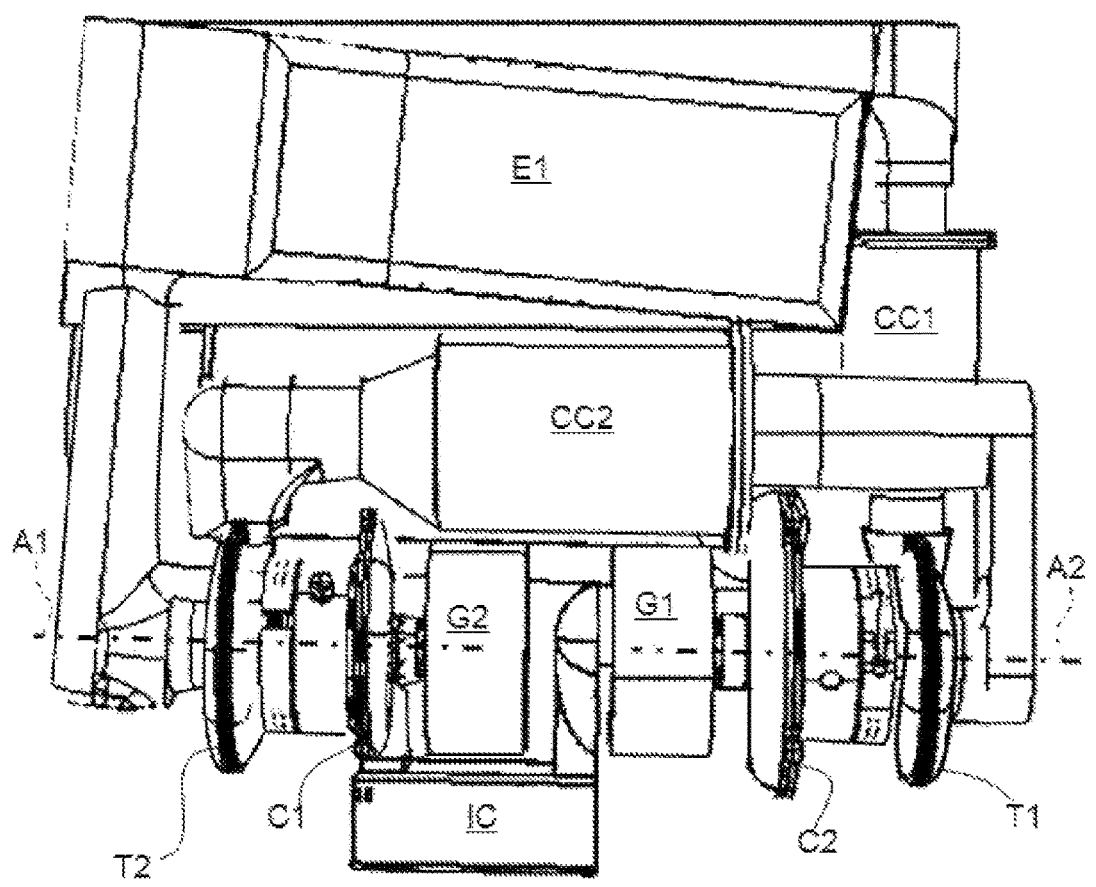

TRI-GENERATION TURBOMACHINE DEVICE AND VEHICLE COMPRISING SUCH A DEVICE

CROSS-REFERENCE TO RELATED APPLICATIONS

This application is the US National Stage under 35 USC § 371 of International Application No. PCT/FR2022/050170, filed Feb. 1, 2022, which claims the priority of claims the priority of the French application No. 2102250 filed on Mar. 9, 2021, the content (text, drawings and claims) of both said applications being incorporated herein by reference.

BACKGROUND

The devices described herein relate to the field of turbomachine devices and systems of the Brayton cycle type with cooled compression, regeneration, and reheating during expansion. This type of turbomachine generally comprises turbines and compressors which may be associated with combustion chambers with heat recovery. The described devices relate in particular to applications that are useful for motor vehicles.

The turbogenerator cycle with an intercooler, an energy recovery unit, and a heat exchanger of the IRReGT type ("Intercooled Regenerative Reheat Gas Turbine") is a high potential cycle. This cycle makes it possible to achieve a very high efficiency but also a very high power density (high specific net work).

This type of turbomachine uses moving parts and produces heat. The turbomachine aims to use these movements and produced heat to implement motor vehicle interior heat and/or cold production, as well as electrical energy generation.

SUMMARY

To achieve this objective, described herein is a turbomachine device for a motor vehicle, the device comprising:
- a first turbocompressor comprising a first compressor and a first turbine;
- a second turbocompressor comprising a second compressor and a second turbine;
- a stream intercooler connected to the first compressor and to the second compressor;
- a heat exchanger, preferably connected to an exhaust outlet and to the second compressor, itself being connected to the two turbines; the device being configured to send a first fluid stream from the first compressor to the intercooler, to the second compressor, to the heat exchanger, and to the turbines, characterized in that it comprises at least one vehicle interior air conditioning section comprising at least one cold and/or heat production means on the basis of said stream.

Advantageously, the arrangement of the device makes it possible to take advantage of the heat of the turbomachine and of the exhaust line in order to produce cold and/or heat for the vehicle interior. This results in a significant drop in fuel consumption.

According to other aspects considered separately, or combined according to all technically feasible combinations:
- the interior air conditioning section comprises a stream bypass between the second compressor and the first heat exchanger, a first cooling exchanger, an air conditioning turbine connected downstream of the first cooling exchanger, and a second cooling exchanger for the production of interior cold connected downstream of the air conditioning turbine; and/or
- the air conditioning turbine is a turbocompressor turbine associated with an air conditioning compressor connected downstream either between the first compressor and the cooler, or upstream of the first compressor; and/or
- the interior air conditioning section comprises an interior air conditioning circuit passing through the intercooler and associated with a circulation pump for a second fluid stream, the air conditioning circuit including a heating exchanger; and/or
- the interior air conditioning section comprises a stream bypass between the second compressor and the first heat exchanger, an additional heat exchanger coupled to the air conditioning circuit and to the stream derived from the bypass, an air conditioning turbine connected downstream of the additional heat exchanger, and a first cooling exchanger for the production of interior cold connected downstream of the air conditioning turbine; and/or
- the air conditioning turbine is a turbocompressor turbine associated with an air conditioning compressor connected downstream either between the first compressor and the cooler, or upstream of the first compressor; and/or
- the turbomachine device comprises a second heat exchanger between the second and first turbines, optionally associated with a heating circuit including a solar concentrator, and/or
- the turbocompressors are mounted on separate axes; and/or the device includes an electrical generator on each of said axes.

Another object is a motor vehicle comprising a turbomachine device.

The described devices will be further detailed by the description of non-limiting embodiments, and based on the appended figures illustrating variants, wherein:

BRIEF DESCRIPTION OF THE FIGURES

FIG. 1 illustrates a block diagram of a turbomachine device according to a preferred first embodiment.

FIG. 2 illustrates a first alternative variant of the first embodiment.

FIG. 3 illustrates a second alternative variant of the first embodiment.

FIG. 4 illustrates a block diagram of a turbomachine device according to a second embodiment.

FIG. 5 illustrates an alternative variant of the second embodiment.

FIG. 6 schematically illustrates a top view of a turbomachine device according to the second embodiment.

DETAILED DESCRIPTION

The described devices relate to a turbomachine device of the type with a gas turbine cycle with cooled compression, regenerator, and reheat during expansion (IRReGT). The described devices relate in particular to applications that are useful for motor vehicles.

The turbomachine device comprises a first turbocompressor and a second turbocompressor.

The first turbocompressor comprises a first compressor C1 and a first turbine T2.

The second turbocompressor comprises a second compressor C2 and a second turbine T1.

In particular, they consist of radial-type turbomachines (compressors and turbines). In this type of machine, the working fluid, air in the case of the compressor and gas in the case of the turbine, has a radial path between the inlet and the outlet.

Preferably, the turbocompressors are electrified, i.e. each includes an electric generator G1, G2. In the preferred variant, this is an electric machine operating both in the motor and generator mode, i.e., in the motor mode to drive and start the system; and in the generator mode to recover the energy.

The turbomachine device further comprises a stream intercooler IC. The stream intercooler IC is connected to the first compressor C1 and to the second compressor C2.

The turbomachine device further comprises a heat exchanger E1. The heat exchanger E1 is connected to the second compressor C2 and the circuit of the fluid F1 continues downstream.

The turbomachine device may be coupled to an exhaust outlet EL or to combustion chambers CC1, CC2 according to the considered embodiment.

In the case of the exhaust line EL (first embodiment), the latter is connected to the heat exchanger E1 to use the heat thereof. Thus, the device then relates to a system for recovering heat from the exhaust line, using the thermal energy of the exhaust gases as an energy source.

In the case of combustion chambers (second embodiment), these are arranged downstream of the first heat exchanger E1 and between the turbines T1, T2. In particular, the heat exchanger E1 is connected to the first combustion chamber CC1 upstream of the turbines T1, T2. The first combustion chamber CC1 is further connected to the second turbine T1 in one variant, or to the first turbine T2 in another variant (not represented).

The second combustion chamber CC2 is connected to the two turbines T1, T2.

The device is configured to send a fluid stream F1 from the first compressor C1 to the intercooler IC. Afterwards, the stream F1 passes from the intercooler IC to the second compressor C2. Afterwards, the stream F1 passes from the second compressor C2 to the heat exchanger E1. Afterwards, the stream F1 passes from the heat exchanger E1 (or energy recovery unit RE) to the turbines T1, T2.

According to an aspect, the turbomachine device comprises at least one vehicle interior air conditioning section comprising at least one means for cooling ($E1_F$) and/or heating ($E1_c$) air on the basis the stream F1. The air flow through these interior cooling and heating means are illustrated in FIGS. 1 to 5 by large vertical arrows oriented downwards.

Advantageously, the arrangement of the device makes it possible to take advantage of the heat of the turbomachine and of the exhaust line EL or the heat derived from the first turbine in order to produce cold and/or heat for the interior of the vehicle. This results in a significant drop in the energy consumption of the vehicle.

Thus, the device makes it possible to produce thermal energy (hot and cold). Indeed, the intercooler IC is used to evacuate an amount of heat outside the cycle. This thermal energy is recovered at the intercooler IC and could be used to heat at a hot exchanger ($E1_C$).

According to one variant, the interior air conditioning section comprises a stream bypass F3 between the second compressor C2 and the first heat exchanger E1. The stream F3 of this bypass is used to produce cold in the interior.

Downstream of the stream bypass F3 is provided a first interior air cooling exchanger $E1_F$, and an air conditioning turbine $E1_F$ connected downstream of the first interior air cooling exchanger $E1_F$. Furthermore, a second interior air cooling exchanger $E2_F$ for producing interior cold is provided, connected downstream of the air conditioning turbine $E1_F$. This variant may be illustrated by FIG. 1. This makes it possible to limit the energy consumption to freshen the interior.

Thus, the device makes it possible to produce cold by recovering pressurized air at the outlet of the compressor C2, then cooling it via an interior air cooling exchanger $E1_F$, and subjecting it to a work-producing expansion. Thus, the air at the outlet of the turbine $T1_F$ will cool down, which will make it possible to produce cold at a second interior air cooling exchanger ($E2_F$).

According to one variant, the air conditioning turbine $T1_F$ is a turbocompressor turbine associated with an air conditioning compressor $C1_F$. The air conditioning compressor $C1_F$ is connected downstream either between the first compressor C1 and the intercooler IC, or upstream of the first compressor C1. Thus, air that is preferably filtered (filter f) passes through the air conditioning compressor $C1_F$ and may be reinjected into the circuit of F1.

According to one variant, the interior air conditioning section comprises an interior air conditioning circuit Ci1 passing through the intercooler IC. The air conditioning circuit Ci1 is associated with a circulation pump P for a second fluid stream F2. The air conditioning circuit Ci1 includes an interior air heating exchanger E1C allowing heat production. Advantageously, this makes it possible to take advantage of the heat exchanges of the intercooler IC to produce heat for the interior.

Thus, circulating the fluid F2 using the pump P makes it possible to return heat from the intercooler IC to discharge them outside at the interior air heat exchanger ($E1c$), thereby producing heat. This is beneficial especially in cold weather. Furthermore, this makes it possible not to depend on a recovery of engine heat (often recovered from the water circuit when it is cold). Thus, this makes it possible to reduce the electrical consumption necessary to activate the electrical resistances. This variant makes it possible to recover the energy from the intercooler IC without generating a pressure drop on the exhaust circuit, unlike an exhaust heat exchanger device of the EHR type (exhaust heat recovery) of the prior art.

In a second embodiment, the heat exchanger E1 or energy recovery unit RE is connected to the outlet of the first turbine T2.

According to one variant, the interior air conditioning section comprises a stream bypass F3 between the second compressor C2 and the first heat exchanger E1. Afterwards, the stream F3 passes into the heat exchanger $IC_F$ before arriving downstream to an air conditioning turbine $T1_F$ and then to a cooling exchanger $E1_F$ for cold production. This variant may be illustrated by FIG. 4.

An additional heat exchanger $IC_F$ may be provided coupled to the air conditioning circuit Ci1 and to the stream F3 derived from the bypass, or an additional energy recovery unit RE2 may be provided coupled to the air conditioning circuit Ci1 and to the stream F1 derived from the first turbine T2.

According to one variant, the turbomachine device comprises a second or interturbine heat exchanger E2 between the second and first turbines T1, T2. According to the considered embodiment, the second heat exchanger E2 may be associated with at least one heating circuit Ci2 associated with the exhaust line EL as illustrated in FIGS. 2 and 3; or at least one heating circuit Ci2 including a solar concentrator SR as illustrated in FIG. 5.

According to an aspect, the turbocompressors are mounted on separate axes A1, A2.

Advantageously, the arrangement of the device makes it possible to have an architecture that can be easily integrated by separating the two turbocompressors without requiring a long common axis with a common direction of rotation. Having two turbocompressors each on its axis, instead of only one, allows the length of the axis to be reduced, and to have more flexibility with regards to the operating points as well as to integration. This therefore makes it possible to reduce the complexity of the device, reduce the manufacturing constraints of the system, reduce the total mass of the machine and minimize the total volume.

These advantages are beneficial for optimizing a turbogenerator designed to be integrated into a motor vehicle drivetrain.

In particular, the first turbocompressor forms a "low-pressure" stage, and the second turbocompressor forms a "high-pressure" stage.

According to the desired variant, the second compressor C2 (HP compressor) may also be coupled to the first turbine T2 (LP turbine) according to the power balance.

According to one variant, the electric generators G1, G2 are on each of said axes. It is also possible to provide an additional generator G1$_F$ on an air conditioning turbine axis T1$_F$.

The turbocompressor configurations and the mentioned architecture make it possible to increase the recovery yield (net electrical power divided by the energy available at the exhaust); to reduce the air flow rate, which makes it possible to reduce the mass and the size of the components; to improve the production of cold, due to the use of a greater expansion (the use of a cooled compression) followed by cooling and expansion; the system allows for much greater yields than the known yields of the heat recovery machines of the ORC (Organic Rankine Cycle), SRC (Steam Rankine Cycle), simple Brayton, Thermoacoustic, Thermoelectricity, Stirling type . . . .

Another object relates to a motor vehicle comprising a turbomachine device as described above. In particular, this is a vehicle with an electric drivetrain preferably of the hybrid type.

The described devices make it possible to produce electrical energy, "hot" thermal energy and "cold" thermal energy. It is compatible with an electric hybrid drivetrain (heat engine associated with an electric motor).

The invention claimed is:

1. A turbomachine device for a motor vehicle, the device comprising:

a first turbocompressor comprising a first compressor and a first turbine;

a second turbocompressor comprising a second compressor and a second turbine;

a stream intercooler connected to the first compressor and to the second compressor;

a first heat exchanger connected to an exhaust outlet, and to the second compressor, itself being connected to the two turbines;

the device being configured to send a fluid stream from the first compressor, to the intercooler, to the second compressor, to the first heat exchanger, and to the turbines, wherein the device comprises at least one vehicle interior air conditioning section;

wherein the interior air conditioning section comprises an interior air conditioning circuit passing through the intercooler and associated with a circulation pump for a second fluid stream, the air conditioning circuit including an interior air heating exchanger; and wherein the interior air conditioning section comprises a stream bypass between the second compressor and the first heat exchanger, a bypass heat exchanger, coupled to the air conditioning circuit and to the stream derived from the bypass, an air conditioning turbine connected downstream of the bypass heat exchanger, and at least one first cooling exchanger for producing interior cold connected downstream of the air conditioning turbine.

2. The turbomachine device according to claim 1, wherein the interior air conditioning section comprises said stream bypass between the second compressor and the first heat exchanger, an air conditioning turbine and said at least one means for cooling, said at least one first cooling exchanger comprising a first interior air cooling exchanger and a second interior air cooling exchanger; said air conditioning turbine being connected downstream of the first interior air cooling exchanger; said second interior air cooling exchanger producing interior cold connected downstream of the air conditioning turbine.

3. The turbomachine device according to claim 2, wherein the air conditioning turbine is a turbocompressor turbine associated with an air conditioning compressor connected downstream either between the first compressor and the intercooler, or upstream of the first compressor.

4. The turbomachine device according to claim 1, wherein the air conditioning turbine is a turbocompressor turbine associated with an air conditioning compressor connected downstream either between the first compressor and the intercooler, or upstream of the first compressor.

5. The turbomachine device according to claim 1, comprising an combustion chamber between the second and first turbines.

6. The turbomachine device according to claim 1, wherein the turbocompressors are mounted on separate axes.

7. The turbomachine device according to claim 6, including an electric generator on each of said axes.

8. A motor vehicle comprising a turbomachine device according claim 1.

* * * * *